United States Patent [19]

Miyamoto et al.

[11] Patent Number: 4,884,396
[45] Date of Patent: Dec. 5, 1989

[54] DESULFURIZING AGENT AND PROCESS FOR TREATING HYDROGEN SULFIDE CONTAINING GAS, COAL GASIFICATION SYSTEM AND POWER GENERATION SYSTEM BASED ON COAL GASIFICATION USING THE DESULFURIZING AGENT

[75] Inventors: Tomohiko Miyamoto, Takahagi; Shuntaro Koyama, Katsuta; Jinichi Tomuro, Katsuta; Atsushi Morihara, Katsuta; Hisao Yamashita; Sadao Takahashi, both of Hitachi; Eiji Kida, Hiroshima; Akio Ueda, Kure; Shigehito Takamoto, Hiroshima, all of Japan

[73] Assignees: Hitachi, Ltd.; Babcock-Hitachi Kabushiki Kaisha, both of Tokyo, Japan

[21] Appl. No.: 155,814

[22] Filed: Feb. 16, 1988

[30] Foreign Application Priority Data

Feb. 16, 1987 [JP]  Japan .................. 62-31473
Jul. 21, 1987 [JP]  Japan .................. 62-181943

[51] Int. Cl.⁴ ............................................. F02C 3/28
[52] U.S. Cl. ............................. 60/39.12; 48/197 R; 55/73; 423/230
[58] Field of Search ............. 60/39.12; 55/73, 74; 423/230, 244 R; 48/197 R

[56] References Cited

U.S. PATENT DOCUMENTS

| | | | |
|---|---|---|---|
| 3,551,124 | 12/1970 | Iwaki et al. | 48/197 R |
| 3,769,197 | 10/1973 | Leas et al. | 48/197 R |
| 3,864,460 | 2/1975 | Connell | 55/73 |
| 3,939,250 | 2/1976 | Michel et al. | 423/230 |
| 4,066,738 | 1/1978 | Daman | 48/197 R |
| 4,175,928 | 11/1979 | Britton et al. | |
| 4,288,979 | 9/1981 | Liljedahl | 60/39.12 |
| 4,313,820 | 2/1982 | Farha | 423/244 R |
| 4,316,813 | 2/1982 | Voss | 55/73 |
| 4,347,811 | 9/1982 | Lee | 55/74 |

FOREIGN PATENT DOCUMENTS

| | | |
|---|---|---|
| 1234043 | 6/1971 | United Kingdom . |
| 1319515 | 6/1973 | United Kingdom . |
| 1452088 | 10/1976 | United Kingdom . |
| 2191111 | 12/1987 | United Kingdom . |

*Primary Examiner*—Louis J. Casaregola
*Attorney, Agent, or Firm*—Antonelli, Terry & Wands

[57] ABSTRACT

The present invention provides a desulfurizing agent comprising a porous oxide carrier, at least one of molybdenum oxide and tungsten oxide as a first component, supported on the carrier, and at least one of manganese oxide, cobalt oxide and nickel oxide as a second component, supported mainly on the surface of the first component. In a coal gasification system using the present desulfurizing agent and a power generation system using the purified gas therefrom, a reduction column for converting a portion of sulfur dioxide in the regenerated gas to hydrogen sulfide as a pretreatment means to a Claus reaction column can be eliminated when the desulfurizing agent is regenerated. Furthermore, in the present invention a desulfurizing agent capable of reacting with hydrogen sulfide to form a solid sulfur compound at a high temperature is supplied to a gasification furnace and the resulting sulfur compound is withdrawn from the gasification furnace as molten slag together with ashes of fine coal powder, where desulfurization can be attained without a Claus reaction column and without a reduction column. Such desulfurization is likewise applicable to a coal gasification system and a power generation system based on the coal gasification.

14 Claims, 1 Drawing Sheet

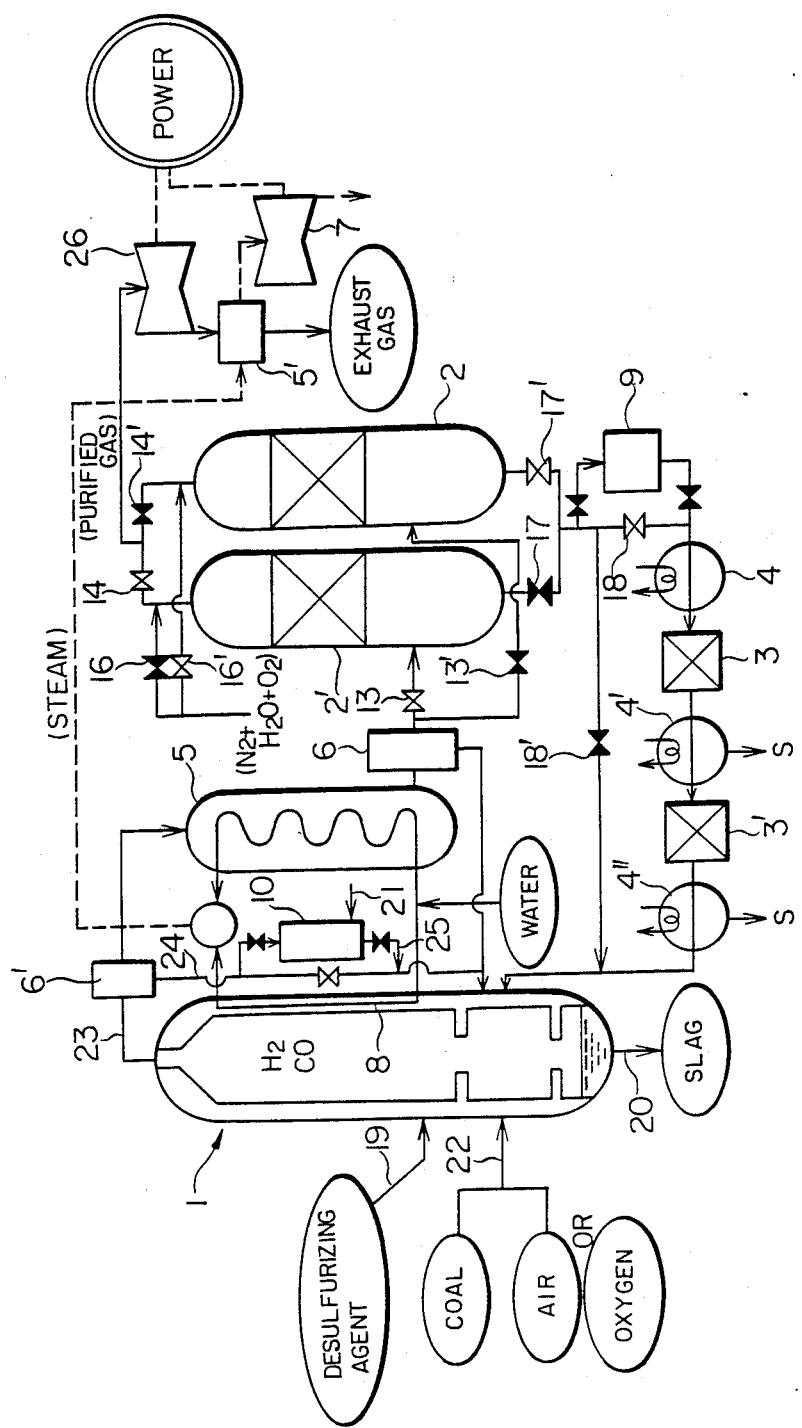

DESULFURIZING AGENT AND PROCESS FOR TREATING HYDROGEN SULFIDE CONTAINING GAS, COAL GASIFICATION SYSTEM AND POWER GENERATION SYSTEM BASED ON COAL GASIFICATION USING THE DESULFURIZING AGENT

BACKGROUND OF THE INVENTION (1) Field of the Invention

This invention relates to a process for purifying a gas containing a sulfur compound and particularly to a desulfurizing agent suitable for removing hydrogen sulfide at a high temperature, and a process for treating a hydrogen sulfide-containing gas, a coal gasification system and a power generation system based on the coal gasification, using the desulfurizing agent.

Coal is widely distributed in all the world and its deposits are larger than the petroleum deposits. Coal has been regarded as a promising substitute energy for petroleum. However, much sulfur is contained in coal as a solid and its direct use as a fuel source is a problem because $SO_2$ is generated by its combustion to pollute the environmental atmosphere. Recently, a system has been developed for gasifying coal in an oxygen-deficient state at a high temperature under a high pressure, removing useless substances such as sulfur compounds from the generated hydrogen and carbon monoxide gases and utilizing the produced gases as a clean energy source has been under development. Processes for removing the useless substances, that is, the sulfides generated from the gasification reaction, are classified into two process types, that is, wet process type and dry process type. The wet process type has been already established and has been practically utilized in various gasification furnaces or in the field of the chemical industry.

According to the wet process type, sulfides, particularly hydrogen sulfide, are removed by chemical absorption and it is necessary to cool the raw gas generated from the gasification reaction to allow an absorbing solution to absorb hydrogen sulfide. Energy losses due to the cooling, regeneration of absorbing solution, treatment of waste water, etc. have been problems.

In the case of the dry process type, on the other hand, hydrogen sulfide is removed from the generated gas at a high temperature without an absorbing solution, and thus there are no such problems as the energy loss due to the cooling and treatment of waste water due to the use of an absorbing solution. The dry process type has been thus regarded as a novel desulfurization process type.

The dry desulfurization process disclosed in Japanese Patent Publication No. 59-32169 uses a desulfurizing agent comprising titanium oxide and at least one of iron oxide and copper oxide. Though the disclosed desulfurizing agent has a good desulfurization efficiency, the oxygen in the iron oxide and the copper oxide as components of the adsorbing agent react with sulfur at an adsorbing temperature of more than 300° C. to form sulfur dioxide. That is, there is a disadvantage of generation of sulfur dioxide during the desulfurization reaction.

Even in the treatment of a hydrogen sulfide-containing gas by a desulfurizing agent comprising titanium oxide and molybdenum oxide, disclosed in Japanese Patent Publication No. 59-19728, the oxygen in the molybdenum oxide reacts with sulfur, if the reaction temperature exceeds 300° C., and the desulfurization efficiency is lowered thereby.

These desulfurizing agents have been developed for the treatment of Claus tail gas and thus the generation of sulfur dioxide during the adsorption of hydrogen sulfide has not been regarded as a problem. However, in the high temperature purification of a gas produced by coal gasification, it is not preferable that sulfur dioxide is generated during the adsorption of hydrogen sulfide. Furthermore, a temperature of more than 300° C., at which no steam is condensed under pressure, is required during the desulfurization.

The process for treating a hydrogen sulfide-containing gas, disclosed in Japanese Patent Application Kokai (Laid-open) No. 59-223792, is directed to a gas produced by coal gasification and it is disclosed that an absorbing agent comprising titanium oxide thermally stabilized with tungsten oxide as a carrier, and at least one oxide of the iron group metals such as iron, nickel, cobalt, etc. and molybdenum, supported on the carrier, is useful, and that, though the hydrogen sulfide absorption rate at a high temperature is substantially equal to that of an absorbing agent containing no tungsten oxide, less deterioration of mechanical strength can be attained. When iron oxide is supported on the carrier and when the regeneration temperature is less than 538° C., $FeSO_4$ is formed and generates sulfur dioxide ($SO_2$) during the desulfurization according to the following reaction:

$$FeSO_4 + 4/3 H_2S \rightleftharpoons FeS + 4/3 H_2O + 4/3 SO_2$$

When the absorbing agent containing sulfur as adsorbed is regenerated, the adsorbed sulfur is released as a regenerated $SO_2$ gas by an oxidizing gas such as oxygen, etc. and the regenerated gas is again subjected to reduction through contact with carbon, hydrogen, etc. in a treating unit such as a reduction column, etc. and is discharged as elemental sulfur through Claus reaction, etc. That is, a reduction column and a reducing agent such as carbon, hydrogen, etc. are required. That is, the regenerated gas is converted to sulfur or hydrogen sulfide through contact with carbon or hydrogen in a column called "reduction column" according to the following reactions (1) and (2):

$$SO_2 + C = CO_2 + S \qquad (1)$$

$$SO_2 + 3H_2 = 2H_2O + H_2S \qquad (2)$$

These reduction reactions require a temperature of more than 700° C. and a relatively long reaction time. After the conversion of $SO_2$ to $S$ and $H_2S$ by the reduction reactions, these gases are cooled to remove $S$ therefrom, and the unreacted $SO_2$ and $H_2S$, etc. are subjected to the following reaction (3) in a high temperature Claus reactor and a low temperature Claus reactor to remove $S$ therefrom:

$$SO_2 + 2H_2S = 2H_2O + \frac{3}{2} S_2 \qquad (3)$$

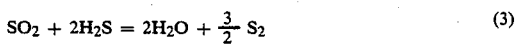

The effluent gas from the low temperature Claus reactor is subjected to further treatment. The fixed bed process can attain an elaborate desulfurization, but requires a reduction column, a high temperature Claus reactor, a low temperature Claus reactor, a unit for treating the effluent gas, etc. to treat the regenerated gas. Thus, there are still operating problems.

The process for producing a gas having a low sulfur content produced by coal gasification, disclosed in Japanese Patent Application Kokai (Laid-open) No. 60-71690, is one of the dry process types, where a desulfurizing agent comprising iron as the main component and having particle sizes of less than 10 μm is contacted with a raw gas in a temperature zone of 400° to 800° C. to fix the sulfides in the raw gas to the desulfurizing agent (reactive adsorption) to separate the sulfides from the raw gas. The process is more useful than the wet processes, but still has such problems that (1) the used desulfurizing agent is not made harmless and (2) the sulfur concentration in the purified gas is higher and its direct application range as a purified gas is limited.

The coal gasification process disclosed in Japanese Patent Application Kokai (Laid-open) No. 60-104188 proposes to solve the problem of said Japanese Patent Application Kokai (Laid-open) No. 60-71690, that is, the treatment of used desulfurizing agent, by charging the used waste desulfurizing agent into the high temperature zone in the gasification furnace, thereby saving the additional treatment of the used desulfurizing agent and also making the discharge of slag from the gasification furnace smooth. However, according to the proposed process, most of the desulfurizing agent is regenerated and recyclically used, whereas only the waste desulfurizing agent that can no more perform recycle use is disposed in the gasification furnace. Thus, the proposed process fails to entirely solve the problems of said Japanese Patent Application Kokai (Laid-open) No. 60-71690. Furthermore, there is still such a problem that it is hard to separate the repeatedly applicable desulfurizing agent from the waste desulfurizing agent in other reactors than a fluidized bed reactor.

Hydrodesulfurization catalysts for separating sulfur in hydrocarbons as hydrogen sulfide are disclosed in Japanese Patent Application Kokai (Laid-open) No. 59-61949 and U.S. Pat. Nos. 4,490,479 and 4,272,400, where no mention is made of a desulfurizing agent for adsorbing hydrogen sulfide as sulfur from a hydrogen sulfide-containing gas, thereby removing the hydrogen sulfide from the gas, as in the present invention.

U.S. Pat. No. 3,928,238 discloses an oxidation catalyst for oxidizing unburned CO in a flue gas to $CO_2$, where no mention is made of a desulfurizing agent as in the present invention.

As described above, the prior art still has such problems that sulfur dioxide is generated during the desulfurization. and the regeneration of used desulfurizing agent is an oxidative regeneration with oxygen, necessitating a reduction step based on a reduction column.

SUMMARY OF THE INVENTION (1) Object of the Invention

An object of the present invention is to provide a desulfurizing agent that can be regenerated while generating hydrogen sulfide and sulfur dioxide at the same time during the regeneration, thereby eliminating a reduction step unnecessary, a process and apparatus for desulfurization with the desulfurizing agent, and also a coal gasification system, using the desulfurizing agent and a power generation system based on the coal gasification.

Another object of the present invention is to provide a process for elaborate desulfurization of a raw gas with a distinguished operability, eliminating the reduction step and Claus reactors in the regeneration of the desulfurizing agent unnecessary, and a coal gasification process based on the process for elaborate desulfurization and a power generation system based on the coal gasification system.

(2) Statement of the Invention

According to a first aspect of the present invention, there is provided a desulfurizing agent which comprises a porous oxide carrier, at least one of molybdenum oxide and tungsten oxide as a first component, supported on the porous oxide carrier, and at least one of manganese oxide, cobalt oxide and nickel oxide as a second component, supported mainly on the surface of the first component.

For the present porous oxide carrier, titanium oxide, alumina, silica, etc. can be used, and particularly titanium oxide is preferable.

As the first component, at least one of molybdenum oxide and tungsten oxide is used, and particularly molybdenum oxide is preferable. The content of the first component is preferably 5 to 25% by atom in terms of metal on the basis of total metals of the desulfurizing agent. A ratio of the first component to the second component is preferably 1:5 to 5:1 by atom in terms of metals. A desulfurization efficiency of more than 95% can be obtained in said ratio range. At a ratio of 1:6, the desulfurization efficiency can be improved, but there is a tendency that the amount of $H_2S$ is reduced during the regeneration.

As the second component, at least one of manganese oxide, cobalt oxide and nickel oxide is used. Its content is preferably 5 to 25% by atom in terms of metal on the basis of total metals of the desulfurizing agent. The second component takes a face-centered cubic lattice structure, and at least one of metal oxide having a smaller ionic diameter than the nearest interatomic distance of the first component.

According to a second aspect of the present invention, there is provided a process for preparing a desulfurizing agent, which comprises impregnating a porous sintered oxide carrier with a solution containing at least one of molybdenum compounds and tungsten compounds as a first component, heating the impregnated carrier in an oxidative atmosphere, thereby calcining the first component, then impregnating the carrier containing the first component with a solution containing at least one of manganese compounds, cobalt compounds and nickel compounds as a second component, and heating the impregnated carrier in an oxidative atmosphere, thereby calcining the second component, the second component being supported on the surface of the first component.

Calcining temperature of the first component and the second component is preferably 500° to 600° C., more preferably 520° to 580° C., most preferably 540° to 560° C. The individual first component and second component fail to undergo satisfactory desulfurization reaction or fail to form hydrogen sulfide and sulfur dioxide even during the regeneration, unless all of the first component and second component are prevented from formation of solid solutions with the carrier and are bound, as the individual oxides, with the carrier on the surface. Thus, it is preferable to carry out the calcining at a temperature as low as possible. The present desulfurizing agent forms sulfur dioxide about 2.3 times as much as hydrogen sulfide during the regeneration. It is preferable that sulfur dioxide is formed in a range of 0.5 to 10 times as much as hydrogen sulfide.

According to a third aspect of the present invention, there is provided a process for treating a hydrogen sulfide-containing gas, which comprises contacting a reducing, high temperature gas containing hydrogen sulfide with a desulfurizing agent comprising a porous oxide carrier, at least one of molybdenum oxide and tungsten oxide as a first component, supported on the carrier, and at least one of manganese oxide, cobalt oxide and nickel oxide as a second component, supported mainly on the surface of the first component, thereby adsorbing the hydrogen sulfide, in the form of a sulfide on the desulfurizing agent. It is preferable to contact the reducing, high temperature gas with the desulfurizing agent at a temperature of 300° to 500° C.

According to a fourth aspect of the present invention, there is provided a process for treating a hydrogen sulfide-containing gas, which comprises contacting a reducing, high temperature gas containing hydrogen sulfide with a desulfurizing agent comprising a porous oxide carrier, at least one of molybdenum oxide and tungsten oxide as a first component, supported on the carrier and at least one of manganese oxide, cobalt oxide and nickel oxide as a second component, supported mainly on the surface of the first component, thereby adsorbing the hydrogen sulfide in the form of a sulfide on the desulfurizing agent and reducing the content of sulfur dioxide in the reducing, high temperature gas removed from the hydrogen sulfide by the adsorption to less than 5 ppm.

The desulfurizing agent having hydrogen sulfide as adsorbed thereon can be regenerated by heating in an oxidative atmosphere. During the regeneration, hydrogen sulfide and sulfur dioxide are formed and subjected to a Claus reaction without reducing these two gas species. The regeneration is carried out preferably by contacting the desulfurizing agent with an oxidative gas at a temperature of 300° to 600° C.

According to a fifth aspect of the present invention, there is provided a process for treating a hydrogen sulfide-containing gas, which comprises contacting a reducing, high temperature gas containing hydrogen sulfide with said desulfurizing agent, thereby adsorbing the hydrogen sulfide in the form of a sulfide onto the desulfurizing agent and removing the hydrogen sulfide from the reducing, high temperature gas, heating the desulfurizing agent having the hydrogen sulfide as adsorbed in the form of the sulfide in an oxidative atmosphere, contacting the thus generated hydrogen sulfide and sulfur dioxide with an oxide-based catalyst without reduction and cooling the resulting gas after Claus reaction, thereby forming liquid sulfur.

The effluent gas thus removed of elemental sulfur can be returned again to a hydrogen sulfide-containing gas generation source.

The present desulfurizing agent can be used in treatment of a gas containing hydrogen, carbon monoxide and sulfides, produced by gasification of coal at a high temperature under high pressure as a hydrogen sulfide-containing gas generation source.

The present invention has been established by experimentally finding that the present desulfurizing agent, prepared by supporting molybdenum oxide ($MoO_3$) on the inside walls in pores of a titanium oxide carrier and then forming at least one metal oxide such as cobalt oxide, nickel oxide, manganese oxide, etc. mainly on the surface of said $MoO_3$, has an action not to form $SO_2$ during the desulfurization but to generate $H_2S$ and $SO_2$ during the regeneration. That is, $MoO_3$ has double bonded oxygen atoms, which react with $H_2S$ during the desulfurization and generate $SO_2$ according to the following reaction:

$$3MoO_3 + H_2S \rightleftharpoons 3MoO_2 + H_2O + SO_2$$

In the present invention the double bonded oxygen atoms are stabilized with the metal oxides to suppress the formation of $SO_2$. It seems that the metals in the metal oxides having a divalency and a smaller ionic diameter than the nearest interatomic distance between the molybdenum atoms in the molybdenum oxide as the first component, such as manganese, iron, cobalt, nickel, copper, etc. and taking a face-centered cubic lattice structure are bound with the double bonded oxygen atoms to cover the surface of molybdenum oxide, and consequently the reaction of the double bonded oxygen atoms of molybdenum oxide with hydrogen sulfide can be suppressed.

The present desulfurizing agent stabilized with the second component carries out desulfurization according to the following reactions (1) to (4):

$$MoO_3 + H_2S \rightleftharpoons MoO_2.S + H_2O \tag{1}$$

$$MoO_3 + H_2S \rightleftharpoons MoO_3.SH_2 \tag{2}$$

$$MoO_3 + 3H_2S \rightleftharpoons MoS_3 + 3H_2O \tag{3}$$

$$MoO_2 + 2H_2S \rightleftharpoons MoS_2 + 2H_2O \tag{4}$$

Cobalt oxide, manganese oxide and nickel oxide as the second component exist on the surface of molybdenum oxide and react with hydrogen sulfide by themselves, acting as desulfurizing agents according to the following reactions (5) to (6):

$$CoO + H_2S \rightleftharpoons CoS + H_2O \tag{5}$$

$$MnO + H_2S \rightleftharpoons MnS + H_2O \tag{6}$$

$$NiO + H_2S \rightleftharpoons NiS + H_2O \tag{7}$$

However, oxides of Fe, Cu, etc. having a divalency and taking the same face-centered cubic lattice structure generate $SO_2$ during the desulfurization according to the following reactions: Oxides of Fe form $FeSO_4$ during the regeneration and $FeSO_4$ reacts with $H_2S$ as follows:

$$FeSO_4 + 4/3H_2S \rightleftharpoons FeS + 4/3H_2O + 4/3SO_2$$

For CuO, $CuO + H_2S \rightleftharpoons CuS + H_2O$

CuS decomposes at 220° C. to form $Cu + \frac{1}{2}S_2$. The formed $S_2$ undergoes the following reaction to generate $SO_2$:

$$3/2S_2 + 2H_2O \rightleftharpoons 2H_2S + SO_2$$

Therefore it is not preferable to use iron oxides and copper oxide as the second component.

The present desulfurizing agent, prepared manly by mixing molybdenum oxide with at least one of nickel oxide, cobalt oxide and manganese oxide, cannot suppress the generation of $SO_2$, and its preparatory procedure is important. The preparation of the desulfurizing agent has been investigated according to two preparatory procedures: according to the first preparatory procedure, a titanium oxide carrier was impregnated at first with salts of Ni, Co and Mn, followed by drying in the atmosphere and calcining, thereby supporting the resulting metal oxides on the inside walls in the pores in the carrier. Then, the carrier was impregnated with a salt of Mo, followed by drying in the atmosphere and calcining, thereby forming an oxide of Mo on the surfaces of Ni oxide, etc. It was found in desulfurization tests that the thus prepared desulfurizing agent could not suppress the generation of $SO_2$.

According to the second preparatory procedure, the titanium oxide carrier was at first impregnated with a salt of Mo, followed by drying in the atmosphere and calcining, thereby forming an oxide of Mo on the inside walls in the pores in the titanium oxide carrier. Then, the carrier was impregnated with salts of Ni, etc., followed by drying in the atmosphere and calcining, thereby forming oxides of Ni, etc. as the second component on the surfaces of the oxide of Mo as the first component. It was found in desulfurization tests that the thus prepared desulfurizing agent could suppress generation of $SO_2$. That is, the present desulfurizing agent can be obtained according to said second preparatory procedure, and the generation of $SO_2$ can be suppressed by covering the surfaces of molybdenum oxide with metal oxides having a face-centered cubic lattice structure as the second component. In the foregoing example, molybdenum oxide is used as the first component, and molybdenum oxide is a molecule of $AB_3$ type having double bonded oxygen atoms and 6 outer shell electrons. $WO_3$ and $CrO_3$ having a similar structure to that of $MoO_3$ are substitutable for $MoO_3$, but $CrO_3$ decomposes into $Cr_2O_3$ at 250° C. and thus is not suitable.

The present desulfurizing agent prepared according to the secondary preparatory procedure was contacted with a gas containing hydrogen sulfide, etc. at 450° C. and sulfurized, and then regenerated with a gas mixture of nitrogen, steam and oxygen. The gas resulting from the regeneration, which will be hereinafter referred to as regenerated gas, contains hydrogen sulfide and $SO_2$ besides nitrogen and steam. According to the conventional regeneration process, as disclosed in Japanese Patent Application Kokai (Laid-open) No. 59-223792, the regenerated gas produced by the similar regeneration contains no hydrogen sulfide but only $SO_2$ as a sulfur compound. This difference seems due to the reactions caused to take place by the present desulfurizing agent. That is, $MoO_3$ as the first component of the present desulfurizing agent adsorbs the sulfide in the form of $MoO_3.SH_2$ according to the reaction (2) at the desulfurization, whereas at the regeneration $MoO_3.SH_2$ undergoes decomposition by steam according to the following reaction:

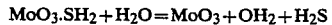

or undergoes thermal decomposition to $MoO_3$ and $H_2S$ by the heat generated by the reaction of sulfides of Ni, etc. as the second component with oxygen as shown below:

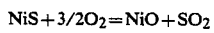

The presence of hydrogen sulfide and $SO_2$ in the regenerated gas resulting from the regeneration of the present desulfurizing agent is characteristic of the present invention.

The present desulfurizing agent will be described in more detail below:

Titanium oxide ($TiO_2$) prepared by adding a mixed solution of water and alcohol to a solution of titanium tetraethoxide in ethanol, thereby forming hydrated titanium oxide through hydrolysis, molding the hydrated titanium oxide together with a binder by kneading, and calcining the molding at 700° to 800° C. for one hour is used as the carrier. The thus prepared carrier is impregnated with a pH-adjusted aqueous solution of ammonium molybdate as the first component in a ratio of Mo atom to Ti atom of 5% to 25%, and the impregnated carrier is dried at 110° C. for 0.5 hours, and then calcined at 500° to 600° C. Then, the carrier is further impregnated with an aqueous solution of cobalt nitrate as the second component in a ratio of Co atom to Ti atom of 25 to 5%, and the impregnated carrier is dried at 110° C. for 0.5 hours and then calcined at 500° to 600° C. Nickel, manganese, etc. as other second components are applied to the impregnation in the form of aqueous solutions of their nitrates in the same manner as in the case of impregnation of cobalt. The respective ranges for the impregnation amounts of the first component and the second component have been determined by the impregnatability of the carrier, and the impregnation over the ranges completely fills the pores of the carrier with the particles of the first and second components to inhibit the diffusion of hydrogen sulfide therethrough. In the thus prepared desulfurizing agent, the second components are formed on the surfaces of the first components in the pores of the carrier, while taking the form of fine particles having particle sizes of a few hundred Å. That is, the first and second components exist in the carrier while being bound with the double bonded oxygens therebetween as though the second components cover the first components, and consequently there takes place an interaction between the first and second components, so that generation of $SO_2$ seems to be suppressed by the action of cobalt, nickel and manganese as the second component during the desulfurization reaction in contrast to the generation of $SO_2$ in the case of the conventional desulfurizing agent.

However, it has been found that when copper and vanadium are used as the second component, generation of $SO_2$ cannot be suppressed. Furthermore, it has been found that when iron is used as the second component, generation of $SO_2$ can be suppressed at the first desulfurization, but iron sulfate is partially formed during the regeneration at a regeneration temperature of less than 540° C. and the iron sulfate ($FeSO_4$) reacts with hydrogen sulfide ($H_2S$) at the second desulfurization to generate $SO_2$ according to the following reaction:

That is, when iron is used as the second component, it is necessary to prevent formation of iron sulfate during the regeneration. To this end, the regeneration temperature must be 540° C. or higher and it is necessary to suppress formation of iron sulfate by providing a sufficient oxidative atmosphere during the regeneration.

The present desulfurizing agent is recyclically used by regeneration and a gas mixture of steam and air or gas mixtures of these single gas species or inert gas with an oxidizing agent, for example, gas mixtures of carbon dioxide, etc. with steam or oxygen, are used for the regeneration. At the regeneration, these gas mixtures are contacted with the desulfurizing agent having sulfur as adsorbed thereon in a temperature range of 300° to 600° C. In the case of a desulfurizing agent containing molybdenum oxide and cobalt oxide as the components the following reactions proceeds during the regeneration. That is, with oxygen, the following reaction takes place to generate much heat:

$$CoS + 3/2O_2 = CoO + SO_2$$

At the same time, the regeneration temperature is elevated higher than the desulfurization temperature by the generated heat, and $MoO_3.SH_2$ undergoes thermal decomposition or reacts with steam according to the following reaction to form $MoO_3$ or $MoO_3.OH_2$:

$$MoO_3.SH_2 + H_2O = MoO_3.OH_2 + H_2S$$

The resulting regenerated gas contains $H_2S$ and $SO_2$. This is a difference from the conventional regenerated gas containing only $SO_2$. That is, in the case of treating the regenerated gas containing only $SO_2$, $SO_2$ is reduced with $H_2$ or carbon to generate $H_2S$ according to the following reaction:

$$SO_2 + 3H_2 = H_2S + 2H_2O.$$

Then, sulfur is formed according to the following reaction:

$$SO_2 + 2H_2S = 2H_2O + 3S$$

That is, the conventional regenerated gas needs reduction, whereas, since $H_2S$ and $SO_2$ are generated at the same time at the regeneration of the present desulfurizing agent, the regenerated gas containing both $H_2S$ and $SO_2$ can be directly subjected to the following Claus reaction and no reduction step is required for formation of sulfur:

$$SO_2 + 2H_2S = 2H_2O + 3S$$

A high temperature gas produced by coal gasification can be desulfurized with the present desulfurizing agent as molded in a granular form, a plate form or a honeycomb form and packed in a desulfurization column, at a temperature of 300° to 600° C., preferably 400° to 500° C. and at a space velocity of 1,000 to 20,000 $hr^{-1}$, preferably 5,000 to 10,000 $hr^{-1}$ in terms of the standard state of the gas for the adsorptive reaction. Regeneration of the used desulfurizing agent is carried out with a gas mixture of steam and air or steam and oxygen at a temperature of 300° to 600° C., preferably 450° to 600° C., desirably a little higher than the temperature for the adsorptive reaction, and at a space velocity of 1,000 to 20,000 $hr^{-1}$, preferably 5,000 to 10,000 $hr^{-1}$.

The regenerated gas, that is, the effluent gas from the regeneration of the desulfurizing agent, is removed of sulfur compounds according to the Claus reaction and returned to the hydrogen sulfide-generating reductive atmosphere upstream of the regeneration-desulfurization step, because the sulfur compounds formed by the regeneration and contained in the regenerated gas cannot be 100% removed by the Claus reaction. That is, the effluent gas from the Claus reaction column contains remaining $SO_2$, $H_2S$, etc. and by returning these remaining sulfur compounds to the hydrogen sulfide-generating reductive atmosphere such as the gasification furnace, etc., $SO_2$ can be converted to $H_2S$ by reduction, and thus any special treatment of the effluent gas from the Claus reaction column can be eliminated.

According to a sixth aspect of the present invention, there is provided a process for treating a hydrogen sulfide-containing gas by removing a sulfur compound from a raw high temperature gas generated by gasification of fossil fuel in a gasification furnace, which comprises a first step of contacting the raw gas with a first desulfurizing agent and returning solid matters remaining after the contacting to the gasification furnace and a second step of contacting the raw gas from the first step with a second desulfurizing agent, thereby purifying the raw gas, allowing the used second desulfurizing agent to react with an oxidizing agent, thereby regenerating the second desulfurizing agent, while returning the thus obtained effluent gas to the gasification furnace, and discharging a sulfur compound from the gasification furnace together with slags.

To satisfy both operability and elaborate desulfurization, the present invention uses a two-stage desulfurization system. That is, in the first stage, calcium-based fine particles such as $CaCO_3$, $Ca(OH)_2$, etc. as a first desulfurizing agent are supplied to a high temperature gasification furnace and decomposed as $CaO$. The thus formed $CaO$ is made to react with sulfur compounds such as $H_2S$, $CoS$, $CS_2$, etc. in the raw gas in the gasification furnace or while being carried over in a transportation state in the raw gas stream to form $CaS$. The raw gas containing solid matters such as $CaS$, unreacted $CaO$, unreacted coal (char) by-produced in the gasification furnace, etc. is separated into the solid matters and the gas in a gas-solid separator. The separated solid matters are oxidized in a newly provided oxidation column to convert $CaS$ to $CaSO_4$ and char to gas such as $CO_2$, etc. and ashes, and the thus obtained $CaSO_4$, ashes, etc. are returned to the gasification furnace together with the gas formed in the oxidation column, or the separated solid matters are directly returned to the gasification furnace without the conversion. The $CaSO_4$, ashes, etc. are melted into the molten ashes (slag) in the gasification furnace and discharged from the gasification furnace as solid solutions.

At the first stage, desulfurization is carried out by contacting the sulfur compounds with fine powder of $CaO$ in a gas stream at a high temperature such as 900° to 1,300° C., and fluctuations in the load on the gasification furnace can be overcome by controlling the rate of the first desulfurizing agent, that is, calcium-based fine powders, to be charged into the gasification furnace, whereby the response to the load fluctuations can be improved. The sulfur compounds separated from the raw gas by adsorption are fixed to the fine particles as $CaSO_4$ and the $CaSO_4$ is dissolved in the slag in the gasification furnace. The slag flows down into the water tank at the bottom of the gasification furnace and is discharged to the outside of the system after cooling. Thus, $CaSO_4$ can be treated as a non-polluting product.

When the first stage desulfurization is carried out through gas stream reaction, as described above, a desulfurization efficiency of 60 to 90% can be obtained. Thus, the raw gas from the first stage desulfurization is led to a desulfurization column at the second stage provided with a fixed bed of the present desulfurizing agent as described before as a second desulfurizing agent. In the fixed bed, a good solid-gas contacting can be obtained, and thus 95% or more of the sulfur compounds in the introduced raw gas can be removed. That is, a desulfurization efficiency of 99% or more can be attained by two-stage desulfurization. There is an equilibrium desulfurization ratio between the second desulfurizing agent for use at the second stage and the raw gas, and thus the second desulfurizing agent must be selected according to the desired purpose.

The second desulfurizing agent for the second stage desulfurization is recyclically used by its regeneration, and all the amount of the effluent gas generated during the regeneration, that is, the so called regenerated gas, is returned to the gasification furnace in the reductive atmosphere and $SO_2$ is converted to $H_2S$ in the gasification furnace according to the reaction (2). That is, it is one of the characteristics of the present invention to convert $SO_2$ to $H_2S$ in the gasification furnace without using a reduction column, a Claus reaction column, etc. for treating the regenerated gas in contrast to the conventional process.

The sulfur compounds adsorbed on the second desulfurizing agent by the second stage desulfurization are converted to $SO_2$ by regeneration of the second desulfurizing agent and the $SO_2$ is returned to the gasification furnace, whereby the $SO_2$ is reduced to $H_2S$. The $H_2S$ is desulfurized in the form of CaS, etc. by the first desulfurizing agent and recovered as solid matters through the solid-gas separation, and the separated solid matters are melted into the slag in the gasification furnace and discharged as the slag to the outside of the system, as described before. The second stage desulfurization is to lower the concentration of sulfur compounds in the product gas according to the desired purpose, that is, to conduct elaborate desulfurization. Absence of treating units for discharging the sulfur compounds to the outside of the system, such as a reduction column, a Claus reaction column, etc. leads to a considerable improvement of the operability. In the sixth aspect of the present invention, it can be said that substantial desulfurization, that is, discharge of the sulfur compounds in the raw gas to the outside of the system is carried out by the first desulfurization agent for the first stage desulfurization.

According to a seventh aspect of the present invention, there is provided a coal gasification system, which comprises a gasification furnace for forming a reducing combustion gas from fine coal powder by means of an oxidizing agent, a desulfurization column for adsorbing hydrogen sulfide contained in the reducing combustion gas onto a desulfurizaing agent, thereby forming a purified reducing combustion gas, a regeneration column for regenerating the desulfurizing agent having the hydrogen sulfide as adsorbed thereon by means of an oxidizing agent, thereby forming a regeneration gas containing hydrogen sulfide and sulfur dioxide and a Claus reaction column for subjecting the hydrogen sulfide and sulfur dioxide in the regeneration gas to Claus reaction in the presence of a catalyst, thereby forming elemental sulfur, the system being further provided with a means for returning an effluent gas from the Claus reaction column after removal of the elemental sulfur from the effluent gas and without a reduction column for converting a portion of the sulfur dioxide in the regeneration gas to hydrogen sulfide as a pretreatment means to the Claus reaction column. The present coal gasification system can be applied to a power generation system based on coal gasification which comprises a gasification furnace with a heat recovery section for forming a reducing combustion gas from fine coal powder by means of an oxidizing agent, the heat recovery section being for forming steam by means of the heat of the reducing combustion gas, a desulfurization column for adsorbing hydrogen sulfide contained in the reducing combustion gas onto a desulfurizing agent, thereby forming a purified reducing combustion gas, a regeneration column for regenerating the desulfurizing agent having the hydrogen sulfide as adsorbed thereon by means of an oxidizing agent, thereby forming a regenerated gas containing hydrogen sulfide and sulfur dioxide, a Claus reaction column for subjecting the hydrogen sulfide and sulfur dioxide in the regeneration gas to Claus reaction in the presence of a catalyst, thereby forming elemental sulfur, a heat exchanger for further heating the steam from the heat recovery section with the reducing combustion gas after dust removal therefrom, a gas turbine driven by the purified reducing combustion gas from the desulfurization column, a steam turbine driven by the steam, and a power generator driven by the gas turbine and the steam turbine.

According to an eighth aspect of the present invention, there is provided a coal gasification system, which comprises a gasification furnace for forming a reducing combustion gas from fine coal powder by means of an oxidizing agent, a desulfurization column for adsorbing hydrogen sulfide contained in the reducing combustion gas onto a desulfurizing agent, thereby forming a purified reducing combustion gas and a regeneration column for regenerating the desulfurizing agent having the hydrogen sulfide as adsorbed thereon by means of an oxidizing agent, thereby forming a regenerated gas containing hydrogen sulfide and sulfur dioxide, the system being further provided with a means for supplying a desulfurizing agent capable of reacting with the hydrogen sulfide, thereby forming a solid sulfur compound at a high temperature to the gasification furnace and withdrawing the sulfur compound from the gasification furnace as molten slag together with ashes of the fine coal powder and a means for returning an effluent gas from the regeneration column to the gasification furnace and without a Claus reaction column for subjecting the hydrogen sulfide and sulfur dioxide in the regeneration gas to Claus reaction in the presence of a catalyst, thereby forming elemental sulfur and without a reduction column for converting a portion of the sulfur dioxide in the regenerated gas to hydrogen sulfide as a pretreatment means to the Claus reaction column.

The present invention can be attained by using the present desulfurizing agent in the desulfurization column in the coal gasification system and power generation system based on the coal gasification system.

BRIEF DESCRIPTION OF THE DRAWING

The single FIGURE is a flow diagram of the present coal gasification system and power generation system based thereon.

PREFERRED EMBODIMENTS OF THE INVENTION

EXAMPLE 1

A solution of titanium tetraethoxide in ethanol was admixed with a mixed solution of water and alcohol and hydrolyzed to form hydrated titanium oxide. The hydrated titanium oxide was dried, pulverized, kneaded with a binder and molded into tablets, 6 mm in diameter and 6 mm high, by a tablet machine, and calcined at 700° C. for one hour to form porous carriers of titanium oxide. Pores in the carriers was 0.01 to 1 $\mu$m in diameter. The carriers were impregnated with an aqueous solution of ammonium molybdate as the first component in ratios of Mo atom to Ti atom in the titanium oxide carriers of 25%, 15% and 5%, and then dried at 110° C. for 0.5 hours and calcined at 550° C. in an oxidative atmosphere for 2 hours. Then, the carriers were cooled to room temperature, impregnated with cobalt nitrate as the second component in ratios of Co atom to Ti atom in the carrier of 5%, 15% and 25%, dried at 110° C. for 0.5 hours, and calcined at 550° C. for 2 hours in an oxidative atmosphere to obtain three kinds of desulfurizing agents. These three kinds of the desulfurizing agents had atomic ratios of Ti:Mo:Co of 70:25:5, 70:15:15 and 70:5:25, respectively.

Performance test of the desulfurizing agents was carried out in the following manner: a reactor tube made of quartz, 10 mm in inner diameter, was externally heated in an electric furnace, and 5 g of the pulverized desulfurizing agent having particle sizes of 0.5 to 1 mm was filled into the reactor tube at the center. A nitrogen gas containing 1.03% by volume of $H_2S$ was passed through the reactor tube at a space velocity of 10,000 $hr^{-1}$ and the composition of the gas at the outlet of the reactor tube was determined by gas chromatography.

Gas temperature for reaction by adsorption on the respective desulfurizing agents and the desulfurizing capacities of the respective desulfurizing agents are shown in the following Table, where the amount of adsorbed S is an increase in the weight on the basis of 100 g of the desulfuring agent.

TABLE

| Desulfurizing agent | Ti:Mo:Co =70:5:25 | | | | | |
|---|---|---|---|---|---|---|
| Gas temp. (° C.) | 200 | 300 | 400 | 500 | 600 | 700 |
| Adsorbed S (g) | 7.6 | 14.1 | 14.6 | 14.8 | 14.7 | 10.5 |
| Outlet $SO_2$ concentration (ppm) | Tr | Tr | Tr | Tr | Tr | Tr |
| Desulfurizing agent | Ti:Mo:Co = 70:15:15 | | | | | |
| Gas temp. (° C.) | 200 | 300 | 400 | 500 | 600 | 700 |
| Adsorbed S (g) | 3.1 | 8.3 | 8.9 | 8.9 | 8.6 | 4.1 |
| Outlet $SO_2$ concentration (ppm) | Tr | Tr | Tr | Tr | Tr | Tr |
| Desulfurizing agent | Ti:Mo:Co = 70:25:5 | | | | | |
| Gas temp. (° C.) | 200 | 300 | 400 | 500 | 600 | 700 |
| Adsorbed S (g) | 1.6 | 5.8 | 6.4 | 6.1 | 5.7 | 1.7 |
| Outlet $SO_2$ concentration (ppm) | Tr | Tr | Tr | Tr | Tr | Tr |

[Tr: below detection limit (5 ppm) of gas chromatography]

As shown in Table, Sulfur is much absorbed onto the desulfurizing agents at a gas temperature of 300° to 600° C. Particularly when the content of the second component exceeds 15%, more than 10 g of S can be adsorbed. The $SO_2$ concentration in the effluent gas after the desulfurization is below the detection limit (5 ppm) of gas chromatography with all the desulfurizing agents.

The desulfurizing agents were regenerated by passing a nitrogen gas containing 2.1% by volume of oxygen and 15% by volume of water at a space velocity of 5,000 $hr^{-1}$ and at a regeneration temperature selected from two temperatures, that is, a temperature by 30° to 60° C. higher than the gas temperature for desulfurization by adsorption and a temperature of 580° to 600° C., independent from the gas temperature for desulfurization by adsorption. At the regeneration at any regeneration temperature, the effluent gas from the regeneration, that is, the regenerated gas, contained $H_2S$ and $SO_2$ and deposition of sulfur was found in the cooling section provided at the outlet of the reactor tube. The regenerated gas was led to a Claus reaction column filled with an alumina-based catalyst and subjected to a primary Claus reaction at about 300° C. Then, the regenerated gas was cooled to about 200° C. and likewise subjected to a secondary Claus reaction, whereby liquid S could be obtained. It was found that the regenerated gas could be directly subjected to Claus reaction without subjecting it to reduction when the present desulfurizing agent was used.

EXAMPLE 2

The carriers prepared in the same manner as in Example 1 were impregnated with molybdenum as the first component dried and calcined and then impregnated with nickel nitrate and manganese nitrate as the second components, dried and calcined in the same manner as in Example 1 to prepare desulfurizing agents. The thus prepared desulfurizing agents were subjected to desulfurization tests by passing a gas having the same composition as in Example 1 therethrough at a space velocity of 10,000 $hr^{-1}$ and the $SO_2$ concentration of effluent gas from the adsorptive desulfurization was measured. In a range of gas temperature for desulfurization by adsorption of 200° to 600° C., the $SO_2$ concentration in the effluent gas was below the detection limit (5 ppm) of gas chromatography.

The desulfurizing agents after the adsorptive desulfurization were regenerated under the same conditions as in Example 1, and it was found that the regenerated gas contained both $H_2S$ and $SO_2$ and sulfur was deposited in the cooling section provided at the outlet of the reactor tube. In this Example, the regenerated gas could be directly led to the Claus reaction column to form elemental sulfur.

EXAMPLE 3

Ammonium molybdate was vapor deposited onto plate carriers of alumina under reduced pressure, followed by calcining under the atmospheric pressure, and then nickel nitrate was vapor deposited thereon under reduced pressure, followed by calcining under the atmospheric pressure, thereby obtaining a plate-form desulfurizing agent. The thus obtained desulfurizing agent was subjected to desulfurization tests in the same manner as in Example 1. It was found that substantially no $SO_2$ was generated during the desulfurization and both $H_2S$ and $SO_2$ were generated when the desulfurizing agent was regenerated in the same manner as in Example 1, and that sulfur was deposited in the cooling section at the outlet of the reactor tube.

COMPARATIVE EXAMPLE

The carriers prepared in the same manner as in Example 1 were impregnated with molybdenum as the first component, dried and calcined, and then impregnated with copper nitrate and vanadium nitrate as the second components, dried and calcined in the same manner as in Example 1 to prepare desulfurizing agents. The thus prepared desulfurizing agents were subjected to desulfurization tests by passing a gas having the same composition as in Example 1 therethrough at a space of 10,000 $hr^{-1}$ and the $SO_2$ concentration in the effluent gas from the adsorptive desulfurization was measured. 100 to a few thousand ppm of $SO_2$ was generated with all the desulfuring agents, though dependent upon the gas temperature for desulfurization by adsorption.

EXAMPLE 4

The single FIGURE is a flow diagram of a power generation system based on coal gasification, using the present desulfurizing agent in the desulfurization column.

Pulverized coal is led to a coal gasification furnace 1 together with air, where the pulverized coal is combusted in an oxygen-deficient state to form a reducing gas containing hydrogen, carbon dioxide and hydrogen sulfide. The reducing gas obtained by the coal gasification contains hydrogen sulfide and thus is led to a desulfurization column 2' packed with a desulfurizing agent prepared in Example 1 or 2 to adsorb the hydrogen sulfide onto the desulfurizing agent in the form of a sulfide at the same temperature as in Example 1 and obtain a purified gas substantially containing no $SO_2$. The purified gas freed from $H_2S$ by adsorption can be used as a fuel gas, etc.

On the other hand, a desulfurizing agent having the sulfide as adsorbed in another desulfurization column 2 is regenerated by introducing steam and air thereto and by heating the desulfurizing agent to the same temperature as in Example 1. Thus, the desulfurization columns 2 and 2' perform desulfurization and regeneration alternately. As the regeneration, a high temperature gas of sulfur dioxide, hydrogen sulfide, nitrogen and steam can be obtained and cooled through a cooler 4 and then led to a Claus reaction column 3 packed with an alumina-based catalyst at a predetermined temperature to form S vapor by Claus reaction. The S vapor is cooled through a cooler 4' to obtain liquid elemental S. The Claus reaction is carried out at first at about 300° C. in the first Claus reaction column 3 and then at about 200° C. in a second Claus reaction column 3'. The effluent gas from the Claus reaction column 3' is returned to the combustion section of the coal gasification furnace 1 through a cooler 4", whereby S can be removed in a closed cycle.

In the power generation system based on coal gasification according to this Example, the gas leaving the coal gasification furnace 1 is led to the desulfurization column 2' through a heat exchanger 5 and a dust collector 6. Steam of high temperature and pressure is generated from water through a pipe provided in the heat exchanger 5 and on the inside wall of the coal gasification furnace 1, and further heated in a heat exchanger 5' with an exhaust gas discharged from a gas turbine 26 and led to a steam turbine 7 to drive the steam turbine, whereby an electric power is obtained by a generator (not shown in the drawing).

In the coal gasification furnace 1, fine coal powder is combusted with an oxidizing agent in a lower combustion ratio than the necessary one for theoretical combustion and gasified, whereby the reducing combustion gas can be formed.

The coal gasification furnace 1 comprises a combustion section for forming the reducing combustion gas, a heat recovery section provided above the combustion section and a slag recovery section provided under the combustion section. A piping 8 is provided on the furnace inside wall in the heat recovery section and heated with the reducing combustion gas to obtain steam from water. The heated steam of high temperature and pressure is heated in the heat exchanger 5 heated by the gas leaving the coal gasification furnace 1. The piping 8 is provided on the entire surrounding furnace inside wall.

The reducing combustion gas leaving the heat exchanger 5 is removed of dusts in the dust collector 6 and then led to the desulfurization column 2'. The reducing combustion gas is at about 1,600° C. in the combustion section and at about 900° C. at the outlet from the heat recovery section. The reducing combustion gas to be led to the heat exchanger 5 is removed of dusts in a dust collector 6'. The thus recovered dusts are returned to the combustion section of the coal gasification furnace 1.

As described before, the effluent gas leaving the desulfurization column 2 at the regeneration of the present desulfurizing agent can be directly led to the Claus reaction column 3 without passing it through a reduction column 9. Even if it is passed through the reduction column 9, consumption of activated carbon as a reducing agent to be used in the reduction column 9 can be reduced.

The purified combustion gas leaving the desulfurization column 2' is used as a fuel gas. In this Example, it is used as a fuel gas for the gas turbine 26. The purified gas leaving the desulfurization column 2' is at a temperature of 300° to 600° C., and is led at the same temperature into a combustor of the gas turbine 26 and combusted into a high temperature gas to drive the turbine 26, whereby an electric power can be obtained through a generator (not shown in the drawing) connected to the gas turbine 26.

As described above, generation of $SO_2$ can be suppressed at the desulfurization and the amount of generated $SO_2$ is a substantially undetectable trace amount. Furthermore, $H_2S$ and $SO_2$ can be generated at the same time when the desulfurizing agent is regenerated, and thus the regenerated gas can be directly subjected to Claus reaction without the necessary reduction step for treating the regenerated gas. Thus, the present invention has a remarkable merit of omitting the reduction column.

EXAMPLE 5

Fine coal powder as a raw material and air as a gasifying agent are supplied into the coal gasification furnace 1 through a supply line 22, and a calcium-based first desulfurizing agent is supplied thereto through a desulfurizing agent line 19. In the coal gasification furnace, the combustion gas containing $H_2$, CO, etc. is contacted with the first desulfurizing agent to fix sulfides in the combustion gas into the first desulfurizing agent as CaS, etc. The combustion gas and the solid matters carried over by the gas are passed through a gas transportation line 23 while contacting with one another, and led to the dust collector 6', where the solid matters are separated from the combustion gas. The solid matters separated from the combustion gas in the dust collector 6' move through another transportation line 24 for passing the solid matters and enter an oxidation column 10. Into the oxidation column 10 an oxidizing agent composed of $N_2$ and $O_2$ is introduced from the outside through an oxidizing agent supply line 21 to oxidize the solid matters into a sulfate and also melt the solid matters at the same time. The molten product containing the sulfate can be discharged from the oxidation column 10, whereas only the combustion gas can be returned to the coal gasification furnace 1, or as shown in the drawing all the products in the oxidation column 10 are returned to the coal gasification furnace 1 through a return line 25, and the solid matters are melted into the slag and discharged through a slag discharge line 20.

On the other hand, the combustion gas leaving the dust collector 6' enters the desulfurization column 2' with a fixed bed of a second desulfurizing agent through the heat exchanger 5, another dust collector 6 and a valve 13. The combustion as contacts the second desulfurizing agent packed in the desulfurization column 2' and is subjected to elaborate desulfurization and then led to the successive units constituting the system, in this Example, the gas turbine 26, through a valve 14 and a purified gas transportation line.

To make continuous operation of the desulfurization column 2' with the fixed bed possible, at least two desulfurization columns must be provided, where the desulfurization column not in the desulfurization operation is to be subjected to regeneration. That is, the desulfurization column 2 interrupted from the introduction of the combustion gas from the dust collector 6 by closing valves 13' and 14' is supplied with an oxygen-containing oxidizing agent as a regenerating gas from a regenerating gas supply line through a valve 16' to convert the sulfur compounds adsorbed on the second desulfurizing agent to $H_2S$ and $SO_2$ and removed into the effluent gas, that is, the regenerated gas. The regenerated gas is returned to the coal gasification furnace 1 through a valve 17' and a gas recycle line from the desulfurization column 2.

To regenerate the second desulfurizing agent in the desulfurization column 2' with the fixed bed, the regenerating gas must be supplied to the desulfurization column 2' through the regenerating gas supply line by closing the valves 13 and 14 and opening valves 16 and 17. In this Example, the regenerated gas is returned directly to the coal gasification furnace 1 without passing it through the Claus reaction columns 3 and 3' by opening a valve 18'.

In this Example, the purified combustion gas is used for combustion in the gas turbine 26 to drive the gas turbine, whereby an electric power is generated by the generator (not shown in the drawing) connected to the gas turbine 26, and the steam turbine 7 is driven by the steam obtained by the coal gasification furnace 1 and the heat exchangers 5 and 5', whereby an electric power is generated by the generator (not shown in the drawing) connected to the steam turbine 7.

The present embodiment will be described in more detail below: Finely pulverized coal and air or oxygen-enriched air as a gasifying agent are supplied to the coal gasification furnace 1 and the coal is partially combusted in the furnace in a temperature of 1,300° to 1,600° C. to form a gas containing CO, $H_2$, $CO_2$, $H_2S$, etc. At the same time, ashes in the coal are melted into a slag, which is discharged to the outside of the system though a slag discharge line 20 at the bottom of the furnace 1. The high temperature combustion gas containing unreacted coal (char) ascends through the furnace 1 where the heat is recovered from the combustion gas and is left at the top of the furnace 1.

The first desulfurizing agent, that is, a substance capable of reacting with $H_2S$, COS, $CS_2$, etc. at a high temperature such as Ca-based, Fe-based, Cu-based or Zn-based fine powder or dolomite fine powder or the like is supplied at a temperature below its melting point to the furnace 1. The fine powder has such a particle size as to allow thorough scattering at the prevailing gas flow velocity throughout the furnace 1 and is supplied to the furnace in an amount of 0.5 to 5 times, preferably 1 to 2.0 times the chemical stoichiometric amount on the basis of the weight of sulfur compound in terms of sulfur atom in the furnace 1. When the Ca-based first desulfurizing agent to be supplied is fine powder of $CaCO_3$, its melting point is about 1,300° C., and thus the first desulfurizing agent supplied to the zone at a lower temperature in the furnace 1 is thermally decomposed into CaO, which reacts with $H_2S$, COS, $CS_2$, etc. formed in the furnace 1 to produce CaS. That is, the sulfur compounds in the combustion gas are fixed into the fine powder, that is, the first desulfurizing agent. The fine powder containing CaS is led to the dust collector 6' while being carried over with the combustion gas. The decomposition temperature of $CaCO_3$ is 825° C., and thus a temperature range of 900° to 1,300° C. is suitable for the effective reaction in the furnace 1. To meet fluctuations in the load in the furnace 1, that is, changes in the rate of coal to be treated, the rate of the fine powder of the first desulfurizing agent to be supplied is changed according to the concentration of sulfur compound in the furnace 1.

In the dust collector 6', solid matters such as char, CaS, CaO, etc. in the combustion gas are separated from the combustion gas. The separated solid matters can be returned directly to the furnace 1 for melting into the slag and discharging the slag to the outside of the furnace 1, but the following procedure is desirable for the following reasons. That is, the solid matters recovered in the dust collector 6' are oxidized in the oxidation column 10. When the Ca-based first desulfurizing agent is used, it is converted mainly to CaS after the desulfurization. The CaS has a melting point of 2,400° C. or higher and is sealed in the slag in a state of enclosing it as a foreign matter. Thus, when such slag is thrown away, there is a fear of dissolving out S from the slag. Even with Fe-based, Cu-based or Zn-based first desulfurizing agent, there is also a fear of dissolving out S from the slag, if such metal sulfides such as FeS, $Cu_2S$ or ZnS are formed correspondingly. It is effective to convert them to relatively stable compounds of low melting points such as $CaSO_4$, $FeSO_4$, $ZnSO_4$, $CuSO_4$, etc. by oxidizing the first desulfurizing agents after the desulfurization. Particularly $CaSO_4$ has a melting point of 1,450° C., which is 950° C. lower than the melting point of CaS, and thus is readily melted in the furnace 1 and fused into the slag in a state of solid solution. Fe-based, Cu-based, or Zn-based first desulfurizing agent can have a melting point of less than 1,000° C. when converted to the corresponding sulfate, and thus the sulfates can be melted in the oxidation column 10 and discharged into a water tank.

On the other hand, the combustion gas leaving the dust collector 6' still contains sulfur compounds such as hydrogen sulfide, etc., and is led to the desulfurization column 2' with the fixed bed, and containing the second desulfurizing agent packed in the column 2' for the second desulfurization and then led to successive units through the purified gas transportation line. The second desulfurizing agent comprising a porous titanium oxide carrier, molybdenum oxide as a first component, supported thereon, and cobalt oxide as a second component, supported on the surface of the first component is packed in the desulfurization column 2'.

At least two desulfurization columns of fixed bed perform desulfurization and regeneration alternatingly, and the second desulfurizing agent is recyclically used. In the FIGURE, the desulfurization column 2' in the desulfurizing operation and the desulfurization column 2 in the regenerating operation are shown. Regeneration of the second desulfurizing agent is carried out in the following manner. By closing the valves 13' and 14' the introduction of the combustion gas into the desulfurization column 2 is interrupted and by opening the valves 16' and 17' a gas mixture of nitrogen and oxygen or a gas mixture of nitrogen, oxygen and steam is supplied as an oxidizing agent into the desulfurization column 2 to oxidize the second desulfurizing agent in the desulfurization column 2 to be regenerated. The sulfur compounds adsorbed on the second desulfurizing agent are desorbed as $SO_2$ and $H_2S$. There are conditions that must be met for the second desulfurizing agent to form sulfates, depending upon the temperature, pressure and regenerating gas composition at the regeneration, and thus regenerating gas whose nitrogen, oxygen and steam concentrations have been adjusted to such concentration ranges as to separate the sulfur compounds as $SO_2$ and $H_2S$ from the second desulfurizing agent must be used. All of the effluent gas leaving the desulfurization column in the regenerating operation, that is, the regenerated gas, is returned to the furnace 1 through the gas recycle line. Particularly $SO_2$ returned to the furnace at a high temperature is reduced with carbon and hydrogen in the furnace 1 and converted to $H_2S$, COS and $CS_2$. That is, by returning the effluent gas from the regeneration of the second desulfurizing agent, that is, the regenerated gas, into the reductive zone in the furnace 1, the reduction column and the Claus reaction column are eliminated and the operability is considerably increased. The regenerated gas can be directly returned to the furnace 1, because the sulfur compounds in the combustion gas are removed at the first stage of desulfurization.

TEXT EXAMPLE

Fine coal powder having a carbon content of 80% by weight and particle sizes of not more than 74 μm was supplied to the coal gasification furnace 1 and 135 $Nm^3/hr$ of air as a gasifying agent was also supplied thereto. Gasification of coal powder was carried out at 1,600° C., while supplying 940 g/hr of $CaCO_3$ as the first desulfurizing agent into the zone at a temperature of 1,200° to 1,300° C. in the upper section of the furnace 1 to carry out the first stage of desulfurization.

The dust collector 6' was constructed from a cyclone and a bag filter, and the solid matters were separated from the combustion gas, and the separated solid matters were oxidized with a gas mixture of oxygen and nitrogen, supplied through the supply line 21 as an oxidizing agent, in the oxidizing column 10 and returned to the furnace 1. On the other hand, the combustion gas leaving the dust collector 6' was passed through the desulfurization column 2' of fixed bed to conduct elaborate desulfurization thereof. The other desulfurization column 2 in the regenerating operation was supplied with a gas mixture of nitrogen and oxygen as a regenerating oxidizing agent, and the effluent gas from the desulfurization column 2 was returned to the reduction section of the furnace 1. The desulfurization column 2' of fixed bed was filled with the second desulfurizing agent comprising a titanium oxide carrier, a molybdenum oxide as a first component, supported on the carrier, and cobalt oxide as a second component, supported thereon, and operated at a temperature of 450° C. and a space velocity of 10,000 $hr^{-1}$. The desulfurization column 2 in the regenerating operation was supplied with a gas containing 3% by volume of oxygen. The sulfur concentration of 874 ppm in the combustion gas at the outlet of the furnace 1 was reduced to 349 ppm at the outlet of the dust collector 6' and further to 33 ppm at the outlet of the desulfurization column 2' of fixed bed. The slag discharged from the furnace 1 contained 2.3% by weight of sulfur, but no sulfur was dissolved out from the slag in the dissolution test of slag.

When the combustion gas was used as a fuel gas for a fuel cell, it was necessary to reduce the sulfur content of the purified combustion gas to less than 0.5 ppm. To this end, the purified gas leaving the desulfurization column 2' was further led to the third stage of desulfurization in a desulfurization column packed with a Zn-based third desulfurizing agent, whereby the sulfur concentration of a few ten ppm could be reduced to less than 0.5 ppm. That is, three-stage desulfurization was preferable in this case.

In this Example, two-stage desulfurization by the first and second desulfurizing agent was carried out and thus elaborate desulfurization for the combustion gas could be attained. The effluent gas from the regeneration of the second desulfurizing agent could be directly returned to the coal gasification furnace, eliminating a reduction column unnecessary or a Claus reaction column, and thus dry process desulfurization at a high temperature could be carried out with a good operability.

What is claimed is:

1. A coal gasification system, comprising: a gasification furnace for forming a reducing combustion gas from fine coal powder by means of an oxidizing agent; at least two desulfurization columns, each having a desulfurizing agent for adsorbing hydrogen sulfide contained in the reducing combustion gas, thereby forming a purified reducing combustion gas when functioning in a desulfurization mode; means for supplying the reducing combustion gas from the gasification furnace to a desulfurization column functioning in the desulfurization mode; means for supplying an oxidizing agent to another desulfuriztion column functioning in a regeneration mode, and for regenerating the desulfurizing agent having the hydrogen sulfide adsorbed thereon, thereby forming a regenerated gas containing hydrogen sulfide and sulfur dioxide; and means for controlling the flow of gases to said at least two desulfurizization columns wherein at least one desulfurization column functions in the desulfurization mode and at least one desulfurization column functions in the regeneration mode during continuous operation; a Claus reaction column for subjecting the hydrogen sulfide and sulfur dioxide in the regenerated gas to Claus reaction in the presence of a catalyst, thereby forming elemental sulfur; means for supplying the regenerated gas directly to the Claus reaction column from a desulfurization column functioning in the regeneration mode; and a means for returning an effluent gas from the Claus reaction column to the gasification furnace after removal of the elemental sulfur from the effluent gas.

2. A power generation system based on coal gasification comprising: a gasification furnace with a heat recovery section for forming a reducing combustion gas from fine coal powder by means of an oxidizing agent, the heat recovery section forming steam by means of the heat of the reducing combustion gas; at least two desulfurization columns, each having a desulfurizing agent for adsorbing hydrogen sulfide contained in the reducing combustion gas, thereby forming a purified reducing combustion gas when functioning in a desulfurization mode; means for supplying the reducing combustion gas from the gasification furnace to a desulfurization column functioning in the desulfurization mode; means for supplying an oxidizing agent to another desulfurization column functioning in a regeneration mode, for regenerating the desulfurizing agent having the hydrogen sulfide adsorbed thereon, thereby forming a regenerated gas containing hydrogen sulfide and sulfur dioxide; and means for controlling the flow of gases to said at least two desulfurization columns wherein at least one desulfurization column functions in the desulfurization mode and at least one desulfurization column functions in the regeneration mode during continuous operation; a Claus reaction column for subjecting the hydrogen sulfide and sulfur dioxide in the regenerated gas to Claus reaction in the presence of a catalyst, thereby forming elemental sulfur; means for supplying the regenerated gas directly to the Claus reaction column from a desulfurization column functioning in the regeneration mode; a heat exchanger for further heating the steam from the heat recovery section with the reducing combustion gas after dust removal therefrom; a gas turbine driven by the purified reducing combustion gas from a desulfurization column functioning in the desulfurization mode; a steam turbine driven by the steam; a power generator driven by the gas turbine and the steam turbine; and means for returning an effluent gas from the Claus reaction column to the gasification furnace after removal of the elemental sulfur from the effluent gas.

3. A power generation system based on coal gasification according to claim 2, further including dust collectors for removing dust from the reducing combustion gas, the dust collectors positioned before the entrance to the heat exchanger and before the entrance to a desulfurization column functioning in the desulfurization mode, means for supplying the reducing combustion gas to the dust collectors from the gasification furnace, and means for returning the collected solid matters from the dust collectors to the gasification furnace.

4. A coal gasification system, comprising: a gasification furnace for forming a reducing combustion gas from fine coal powder by means of an oxidizing agent; at least two desulfurization columns each having a desulfurizing agent for adsorbing hydrogen sulfide contained in the reducing combustion gas, thereby forming a purified reducing combustion gas when functioning in a desulfurization mode; means for supplying the reducing combustion gas from the gasification furnace to a desulfurization column functioning in the desulfurization mode; means for supplying an oxidizing agent to another desulfurization column functioning in a regeneration mode, for regenerating the desulfurizing agent having the hydrogen sulfide adsorbed thereon, thereby forming a regeneration gas containing hydrogen sulfide and sulfur dioxide; and means for controlling the flow of gases to said at least two desulfurization columns wherein at least one desulfurization column functions in the desulfurization mode and at least one desulfurization column functions in the regeneration mode during continuous operation; means for supplying a second desulfurizing agent to the gasification furnace, the second desulfurizing agent being capable of reacting with hydrogen sulfide, thereby forming a solid sulfur compound at a high temperature; and means for withdrawing the sulfur compound from the gasification furnace as molten slag together with ashes of the fine coal powder.

5. A coal gasification system, comprising: a gasification furnace for forming a reducing combustion gas from fine coal powder by means of an oxidizing agent; at least two desulfurizing column each having a desulfurizing agent for adsorbing hydrogen sulfide contained in the reducing combustion gas, thereby forming a purified reducing combustion gas when functioning in a desulfurization mode; means for supplying the reducing combustion gas from the gasification furnace to a desulfurization column functioning in the desulfurization mode; means for supplying an oxidizing agent to another desulfurization column functioning in a regeneration mode, for regenerating the desulfurizing agent having the hydrogen sulfide adsorbed thereon, thereby forming a regenerated gas containing hydrogen sulfide and sulfur dioxide; and means for controlling the flow of gases to said at least two desulfurization columns wherein at least one desulfurization column functions in the desulfurization mode and at least one desulfurization column functions in the regeneration mode during continuous operation; means for supplying a second desulfurization agent to the gasification furnace, the second desulfurizing agent being capable of reacting with the hydrogen sulfide, thereby forming a solid sulfur compound at a high temperature; means for withdrawing the sulfur compound from the gasification furnace as molten slag together with ashes of fine coal powder; and means for returning an effluent gas from a desulfurization column functioning in the regeneration mode directly to the gasification furnace 6. A power generation system based on coal gasification comprising: a gasification furnace having a heat recovery section for forming a reducing combustion gas from fine coal powder by means of an oxidizing agent, the heat recovery section forming steam by means of the heat of the reducing combustion gas; at least two desulfurization columns each having a desulfurizing agent for adsorbing hydrogen sulfide contained in the reducing combustion gas, thereby forming a purified reducing combustion gas when functioning in a desulfurization mode; means for supplying the reducing combustion gas from the gasification furnace to a desulfurization column functioning in the desulfurization mode; means for supplying an oxidizing agent to another desulfurization column functioning in a regeneration mode, for regenerating the desulfurizing agent having the hydrogen sulfide adsorbed thereon, thereby forming a regenerated gas containing hydrogen sulfide and sulfur dioxide; and means for controlling the flow of gases to said at least two desulfurization columns wherein at least one desulfurization column functions in the desulfurization mode and at least one desulfurization column functions in the regeneration mode during continuous operation; a heat exchanger for further heating the steam from the heat recovery section with the reducing combustion gas after dust removal therefrom; a gas turbine driven by the purified reducing combustion gas from a desulfurization column functioning in the desulfurization mode; a steam turbine driven by the steam; a power generator driven by the gas turbine and the steam turbine; means for supplying a second desulfurizing agent to the gasification furnace, the second desulfurizing agent being capable of reacting with the hydrogen sulfide, thereby forming a solid sulfur compound at a high temperature; and means for withdrawing the sulfur compound from the gasification furnace as molten slag together with ashes of the fine coal powder.

7. A power generation system based on coal gasification comprising: a gasification furnace with a heat recovery section for forming a reducing combustion gas from fine coal powder by means of an oxidizing agent, the heat recovery section forming steam by means of the heat of the reducing combustion gas; at least two desulfurization columns each having a desulfurizing agent for adsorbing a hydrogen sulfide contained in the reducing combustion gas, thereby forming a purified reducing combustion gas when functioning in a desulfurization mode; means for supplying the reducing combustion gas from the gasification furnace to a desulfurization column functioning in the desulfurization mode; means for supplying an oxidizing agent to another desulfurization column functioning in a regeneration mode, for regenerating the desulfurizing agent having the hydrogen sulfide adsorbed thereon, thereby forming a regenerated gas containing hydrogen sulfide and sulfur dioxide; and means for controlling the flow of gases to said at least two desulfurization columns wherein at least one desulfurization column functions in the desulfurization mode and at least one desulfurization column functions in the regeneration mode during continuous operation; a heat exchanger for further heating the steam from the heat recovery section with the reducing combustion gas after dust removal therefrom; a gas turbine driven by the purified reducing combustion gas from a desulfurization column functioning in the desulfurization mode; a steam turbine driven by the steam; a power generator driven by the gas turbine and the steam turbine; means for supplying a second desulfurizing agent to the gasification furnace, the second desulfurization agent being capable of reacting with the hydrogen sulfide, thereby forming a solid sulfur compound at a high temperature; and means for withdrawing the sulfur compound from the gasification furnace as molten slag together with ashes of fine coal powder; and means for returning an effluent gas from a desulfurization column functioning in the regeneration mode directly to the gasification furnace.

8. A power generation system based on coal gasification according to claim 7, further including dust collectors for removing dust from the reducing combustion gas, the dust collectors positioned before the entrance to the heat exchanger and before the entrance to a desulfurization column functioning in the desulfurization mode, means for supplying the reducing combustion gas to the dust collectors from the gasification furnace, and means for returning the collected solid matters from the dust collectors to the gasification furnace.

9. A coal gasification system, comprising: a gasification furnace for forming a reducing combustion gas from fine coal powder by means of an oxidizing agent; at least two desulfurization columns each having a desulfurization agent for adsorbing hydrogen sulfide contained in the reducing combustion gas, thereby forming a purified reducing combustion gas when functioning in a desulfurization mode; means for supplying the reducing combustion gas from the gasification furnace to a desulfurization column functioning in the desulfurization mode; means for supplying an oxidizing agent to another desulfurizing column functioning in a regeneration mode, for regenerating the desulfurizing agent having the hydrogen sulfide adsorbed thereon, thereby forming a regenerated gas containing hydrogen sulfide and sulfur dioxide; and means for controlling the flow of gases to said at least two desulfurization column wherein at least one desulfurization column functions in the desulfurization mode and at least one desulfurization column functions in the regeneration mode during continuous operation; a Claus reaction column for subjecting the hydrogen sulfide and sulfur dioxide in the regenerated gas to Claus reaction in the presence of a catalyst, thereby forming elemental sulfur; means for supplying the regenerated gas directly to the Claus reaction column from a desulfurization column functioning in the regeneration mode; and means for returning an effluent gas from the Claus reaction column to the gasification furnace after removal of the elemental sulfur from the effluent gas; wherein the desulfurizing agent comprises a porous oxide carrier, at least one of molybdenum oxide and tungsten oxide as a first component, supported on the porous oxide carrier, and at least one manganese oxide, cobalt oxide add nickel oxide as a second component, supported mainly on the surface of the first component.

10. A power generation system based on coal gasification comprising: a gasification furnace with a heat recovery section for forming a reducing combustion gas from fine coal powder by means of an oxidizing agent, the heat recovery section forming steam by means of the heat of the reducing combustion gas; at least two desulfurization columns each having a desulfurizing agent for adsorbing hydrogen sulfide contained in the reducing combustion gas, thereby forming a purified reducing combustion gas when functioning in a desulfurization mode; means for supplying the reducing combustion gas from the gasification furnace to a desulfurization column functioning in the desulfurization mode; means for supplying an oxidizing agent to another desulfurization column functioning in a regeneration mode, for regenerating the desulfurizing agent having the hydrogen sulfide adsorbed thereon, thereby forming a regenerated gas containing hydrogen sulfide and sulfur dioxide; and means for controlling the flow of gases to said at least two desulfurization columns wherein at least one desulfurization column functions in the desulfurization mode and at least one desulfurization column functions in the regeneration mode during continuous operation; a Claus reaction column for subjecting the hydrogen sulfide and sulfur dioxide in the regenerated gas to Claus reaction in the presence of a catalyst, thereby forming elemental sulfur; means for supplying the regenerated gas directly to the Claus reaction column from a desulfurization column functioning in the regeneration mode; a heat exchanger for further heating the steam from the heat recovery section with the reducing combustion gas after dust removal therefrom; a gas turbine driven by the purified reducing combustion gas from a desulfurization column functioning in the desulfurization mode; a steam turbine driven by the steam; a power generator driven by the gas turbine and the steam turbine; means for returning an affluent gas from the Claus reaction column to the gasification furnace after removal of the elemental sulfur from the effluent gas; wherein the desulfurizing agent comprises a porous oxide carrier, at least one of molybdenum oxide and tungsten oxide as a first component, supported on the carrier, and at least one of manganese oxide, cobalt oxide and nickel oxide as a second component, supported mainly on the surface of the first component.

11. A coal gasification system, comprising: a gasification furnace for forming a reducing combustion gas from fine coal powder by means of an oxidizing agent; at least two desulfurization columns each having a desulfurizing agent for adsorbing hydrogen sulfide contained in the reducing combustion gas, thereby forming a purified reducing combustion gas when functioning in a desulfurization mode; means for supplying the reducing combustion gas from the gasification furnace to a desulfurization column functioning in the desulfurization mode; means for supplying an oxidizing agent to another desulfurization column functioning in a regeneration mode, for regenerating the desulfurizing agent having the hydrogen sulfide adsorbed thereon, thereby forming a regenerated gas containing hydrogen sulfide and sulfide dioxide; and means for controlling the flow of gases to said at least two desulfurization columns wherein at least one desulfurization column functions in the desulfurization mode and at least one desulfurization column functions in the regeneration mode during continuous operation; means for supplying a second desulfurizing agent to the gasification furnace, the second desulfurizing agent being capable of reacting with the hydrogen sulfide, thereby forming a solid sulfur compound at a high temperature; means for withdrawing the sulfur compound from the gasification furnace as molten slag together with ashes of the fine coal powder; and means for returning an effluent gas from a desulfurization Column functioning in the regeneration mode directly to the gasification furnace; wherein the desulfurizing agent comprises a porous oxide carrier, at least one of molydenum oxide and tungsten oxide as a first component, supported on the carrier and at least one of manganese oxide, cobalt oxide and nickel oxide as a second component, supported mainly on the surface of the first component.

12. A power generation system based on coal gasification comprising: a gasification furnace with a heat recovery section for forming a reducing combustion gas from fine coal powder by means of an oxidizing agent, the heat recovery section forming steam by means of the heat of the reducing combustion gas; at least two desulfurization columns each having a desulfurizing agent for adsorbing hydrogen sulfide contained in the reducing combustion gas, thereby forming a purified reducing combustion gas when functioning in a desulfurization mode; means for supplying the reducing combustion gas from the gasification furnace to a desulfurization column functioning in the desulfurization mode; means for supplying an oxidizing agent to another desulfurization column functioning in a regeneration mode, for regenerating the desulfurizing agent having the hydrogen sulfide adsorbed thereon, thereby forming a regenerated gas containing hydrogen sulfide and sulfur dioxide; and means for controlling the flow of gases to said at least two desulfurization columns wherein at least one desulfurization column functions in the desulfurization mode and at least one desulfurization column functions in the regeneration mode during continuous operation; a heat exchanger for further heating the steam from the heat recovery section with the reducing combustion gas after dust removal therefrom; a gas turbine driven by the purified reducing combustion gas from a desulfurization column functioning in the desulfurization, mode; a steam turbine driven by the steam; a power generator driven by the gas turbine and the steam turbine; means for supplying a second desulfurizing agent to the gasification furnace, the second desulfurizing agent being capable of reacting with the hydrogen sulfide, thereby forming a solid sulfur compound at a high temperature; and means for withdrawing the sulfur compound from the gasification furnace as molten slag together with ashes of the fine coal powder; wherein the desulfurizing agent comprises a porous oxide carrier, at least one of molybdenum oxide and tungsten oxide as a first component, supported on the porous oxide carrier, and at least one of manganese oxide, cobalt oxide and nickel oxide as a second component, supported mainly on the surface of the first component.

13. A coal gasification system according to claim 1, further including means for switching the desulfurizing columns from the desulfurization mode to the regeneration mode upon saturation of the desulfurizing agent with hydrogen sulfide and from the regeneration mode to the desulfuization mode upon regeneration of the desulfurizing agent.

14. A coal gasification system according to claim 4, wherein the second desulfurizing agent is a Ca-based, Fe-based, Cu-based, Zn-based or dolomite fine powder.

* * * * *